Patented May 21, 1935

2,002,400

UNITED STATES PATENT OFFICE 2,002,400

FERTILIZER

Edward T. Keenan, Frostproof, Fla., assignor of one-half to Florida Fruit Canners Inc., Frostproof, Fla., a corporation of Florida No Drawing. Application January 21, 1933, Serial No. 652,933

2 Claims. (Cl. 71—9)

This invention relates to an improvement in fertilizers of the character that are chemically balanced. By chemically balanced is meant that many of the salts containing the mineral acid radical have been precipitated as insoluble compounds still leaving the plant food items as soluble chemical compounds but without the mineral acid forming radical.

Plants feed from organic compounds of these elements. It is a general practice however to supply these to the soil from the cheaper mineral or inorganic sources such as ammonium sulphate and potassium sulphate, etc., which are the most common sources. When these are put in the soil the sulphuric acid derived from the sulphates acts on the silica forming silicic acid which in turn acts on the potassium forming insoluble or useless potassium compounds.

It is the purpose of my invention to use up the mineral acids and to combine them with useless or cheap bases, forming insoluble compounds before the fertilizer gets to the soil so that when it is applied to the soil there is no tendency for the fertilizer to form insoluble compounds because the items which would form these insoluble compounds have already combined.

In the fertilization of citrus trees it has been recommended that the three elements (nitrogen as ammonia, phosphoric acid, potassium as potash) be supplied in the proportions of 4—8—10, but a proportion of 4—1—5 would theoretically be sufficient. Thus the differences between 4—1—5 and 4—8—10 is lost due to reversion and leeching. With my product there is no tendency to revert in the soils as found in some or all of the citrus fruit sections and particularly Florida, and a less tendency to revert in any soil.

In carrying out my process for producing chemically balanced fertilizer I have used the following ingredients in the proportions mentioned:

| | Pounds |
|---|---|
| Wet citrus pomace | 2000 |
| Cyanamid | 300 |
| Calcium sulphate | 80 |
| Nitrate of soda-potash (18—18) | 215 |
| Sulphate of potash | 50 |
| Ammonium sulphate | 100 |
| Triple super phosphate | 250 |

It may be found desirable to omit one or more of the ingredients mentioned or to vary the proportions given while yet not departing from my invention and producing a chemically balanced fertilizer, but I have obtained very good results with the ingredients mentioned.

The pomace is the waste from a citrus fruit canning factory such as hulls, cull fruit and the like ground up to a pasty mass. To this acid citrus pomace is added the alkaline cyanamid. The chemical reaction set up raises the temperature of this mixture to approximately 200° F. or higher, and the cyanamid is broken down forming urea and other ammonia compounds together with calcium carbonate from the lime in the cyanamid.

The cyanamid and pomace, after being mixed, are placed in a pile and permitted to stand whereby an increase in the temperature develops as mentioned and while at this temperature in the pile, the calcium sulphate, nitrate of soda, sulphate of potash, ammonium sulphate, and phosphate are added in the correct proportions so that the acid radical of the substances unites with the lime or calcium to form insoluble calcium compound such as calcium sulphate, the ammonium, potassium (potash) and super-phosphate combining to form ammonium-potassium-phosphate fertilizer together with other soluble salts as ammonium phosphate, etc. The calcium sulphate may be added at this time, or before the cyanamid, if desired. The resultant product after being thus treated is a chemically balanced fertilizer with the food elements perfectly combined in a definite chemical equilibrium.

The product has been found to analyze about 6—6—3 per cent, of ammonia ($NH_3$), phosphorous pentoxide ($P_2O_5$), and potassium oxide ($K_2O$) respectively.

I obtain from organic matter from the citrus pomace such organic acids to unite with the soluble plant foods producing a high efficiency in fertilizers. Sufficient organic matter is incorporated with or associated with the soluble salts to form organic plant food compounds from the mineral salts.

I claim:

1. A process of preparing a fertilizer which comprises mixing cyanamid and fruit pomace, piling the mixture for a period of time, whereby a reaction ensues and a rise in temperature takes place, and thereafter while at the increased temperature adding to the mixture alkali metal nitrates, ammonium sulphate, and super phosphate, which combine with the mixture.

2. A process of preparing a fertilizer which comprises mixing cyanamid and citrus pomace, piling the mixture for a period of time, whereby a reaction ensues and a rise in temperature takes place, and thereafter while at the increased temperature adding to the mixture nitrate of soda, sulphate of potash, ammonium sulphate, and super phosphate, which combine with the mixture to form ammonium-potassium-phosphate fertilizer with soluble salts.

EDWARD T. KEENAN.